March 30, 1954     B. W. COLMAN     2,673,805
POPCORN PACKAGE
Filed March 2, 1953

INVENTOR.
BENJAMIN W. COLMAN
BY Benjamin W. Colman
ATTORNEY

Patented Mar. 30, 1954

2,673,805

UNITED STATES PATENT OFFICE 2,673,805

POPCORN PACKAGE

Benjamin W. Colman, Berkley, Mich., assignor, by mesne assignments, to Top-Pop Products Company, Detroit, Mich., a corporation of Michigan Application March 2, 1953, Serial No. 339,765

1 Claim. (Cl. 99—171)

This invention relates to a popcorn package, and more particularly to a compact package in which unpopped corn and a frying fat are stored for cooking therein, said package being expandable under the pressure of the expanding popped corn.

One of the principal objections that most people have to home popping of corn, used commonly as a confection, is the greasy mess of pans that must be cleaned up after cooking. The inventive construction here described provides a compact package containing unpopped corn and a frying fat, which can be purchased in a store, taken home and placed directly upon a heating stove. The heat will pop the corn, and the package which was relatively small in volume, as manufactured and sold, will expand to several times its original volume to contain the greatly expanded volume of popped corn. In addition, the package is preferably made of aluminum foil which is comparatively inexpensive. An important element in this invention is the combination of two different gages of aluminum foil, enabling the package to expand greatly in volume.

One object of the invention is the provision of a compact popcorn package which contains unpopped corn and a frying fat and which is used as a popcorn cooker without modification.

Another object is to provide a compact small volume popcorn package which is used as a popcorn cooker and which will increase in cubic content as the corn pops and expands.

A further object is the provision of a compact popcorn cooker package made of aluminum foil, in which the lower cup portion is made of a relatively heavy gage of hard rolled, substantially non-expandable aluminum foil, and the upper cover portion of which is made of a relatively light gage of soft annealed aluminum foil which is very easily caused to move and expand under heating and pressure by the popped corn.

Another object is the provision of a compact popcorn package that is simply constructed, inexpensive to produce and easy to use. In compact form, the popcorn package provides a nesting feature so that many can be combined within a relatively small space.

Additional objects of the invention will become apparent from the following description.

Referring now to the drawing annexed hereto and forming an integral part of this specification, Fig. 1 is a plan view of the compacted popcorn package of this invention.

Figure 1:
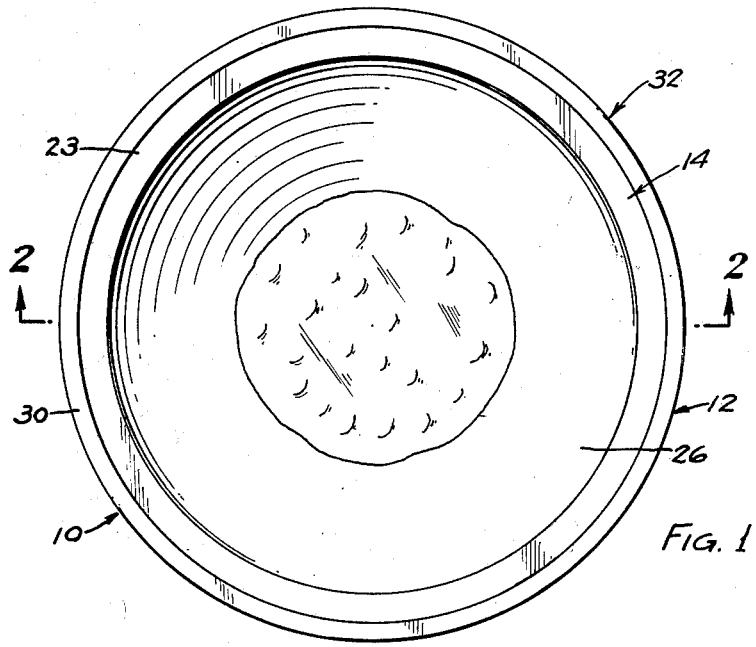
Figure 2:
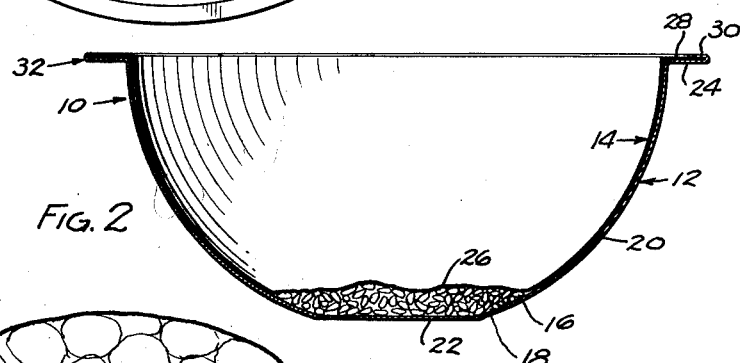
Fig. 2 is a vertical sectional view on the line 2—2 of Fig. 1.

As shown in Fig. 1, a compact popcorn package 10 is composed of a lower cooking cup-shaped vessel 12, a vessel cover 14, a quantity of unpopped corn 16 and a suitable measure of frying fat 18.

The lower cooking cup-shaped vessel 12 is preferably formed as shown, with a substantially semi-spherical bowl 20 having a flat bottom portion 22, and a peripheral flange portion 24 at the top. The vessel 12 should be made of a heavy gage hard rolled aluminum foil, preferably .005" thick or more. Since the cooking heat is applied directly to this portion of the popcorn package it is important that it have substantial thickness to carry and hold the heat without melting, in addition to the need to resist deformation during ordinary handling operations. If desired, steel or tin plate may be used for the vessel 12. Many tests have shown that aluminum foil of .005" thickness and heavier is satisfactory for this portion of the package.

An extremely light gage of soft annealed aluminum foil is used for the vessel cover 14. It has been found that a thickness of .00035" or less is satisfactory. The configuration of the cover 14 is substantially the same as for vessel 12, and generally of the same dimensions. The semi-spherical cover bowl portion 26 having a peripheral flange 28 is arranged to cover corn 16 and frying fat 18 which are placed in the bottom of vessel bowl 20.

Cover flange 28 on the peripheral edge of cover bowl portion 26 is placed over a portion of vessel bowl flange 24 and it is held in place by bowl flange portion 30 which is bent over and pressed down upon into a simple lap seam 32 as shown. A rounded seam having a tubular section (not shown) may also be employed.

In order that the package be suitable for storage on a store shelf and for transportation to and from the store with a minimum of handling difficulties, it is preferred to use a frying fat 18 that is substantially solid at normal room and store temperatures, summer and winter. By use of such a fat, the package 10 may be inadvertently or intentionally overturned without having liquid fat run out of the package, inasmuch as the lap seam 32 of the vessel and cover is not a liquid seal. A frying fat that meets these requirements is coconut oil prepared with other ingredients and having a melting point of approximately 105–125° Fahrenheit, and is substantially solid up to that range.

Ordinary popping corn 16, as presently available, is suitable for use in this package 10. There may however be similar foods which expand greatly upon cooking in a frying fat that may also be combined as is the popping corn; and it is to be understood that such packaged foods are included in the contemplation of this invention.

In operation, the vessel 12 is first formed as described and shown, and corn 16 and fat 18 are placed together in the bottom portion 22 of bowl 20. Cover 14 is placed over the ingredients with cover bowl portion 26 arranged in contact with the corn and fat, and against the sides of vessel bowl 20. Cover flange 28 is disposed over vessel flange portion 24 and lap seam 32 is formed by pressing vessel flange portion 30 over cover flange 28.

Figure 3:
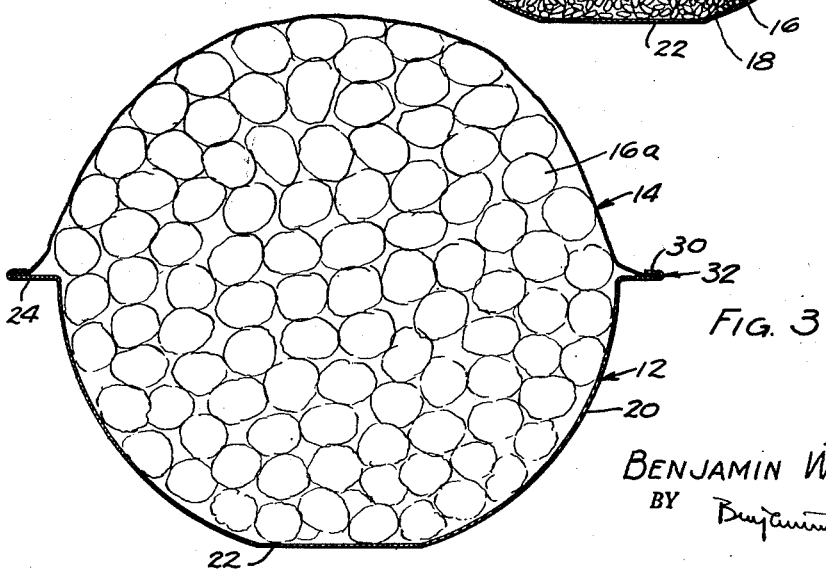
Fig. 3 is a vertical sectional view similar to Fig. 2 showing the popped corn therein and the relative changes in the package configuration and volume.

Upon application of heat to the bottom portion of bowl 20, the fat 18 will melt and upon reaching a suitable frying temperature, about 350°–390° Fahrenheit, the corn 16 will pop and expand. As the corn 16 pops, it breaks open with a cracking sound and beats against the cover bowl portion 26. Because of its light gage and the fact that it is made of a soft annealed metal, cover bowl portion 26 is expanded from its depressed concave form of Fig. 1 to the convex shape shown in Fig. 3. The force and expansion of the popped corn 16a simply pushes the cover bowl portion 26 upwardly, until it is substantially filled with popped corn 16a.

The quantity of corn 16 which will be quite satisfactory for package 10 is approximately 1 ounce per 62 cubic inches of expanded package. Frying fat 18 sufficient to cover the corn 16 is a suitable measure. The corn 16 may, of course, pop larger or smaller, and these dimensional specifications for weight and volume are fairly approximate only. An amount of corn substantially in excess of that indicated, or a volume of fat substantially less than described, may result in considerable burning of the corn. The following package specifications have been found suitable and satisfactory. For 1 ounce of popping corn and ⅔ ounce of frying fat, a vessel bowl 20 and cover bowl portion 26 formed into 5″ diameter semi-spheres will provide an excellent package 10. The package 10, of course, may be arranged in forms other than spherical, or semi-spherical.

After the corn 16 has been popped, the package 10 is removed from the heating stove, and vessel cover 14 is torn open. A knife or fork will be satisfactory to perform this operation, as the very light gage aluminum foil composing cover 14 is easily rent by a sharp instrument. By inverting the package 10, the popped corn 16a is emptied into a suitable serving bowl or other container. Package 10 can then be discarded, and the cleaning of greasy pots or pans has been completely eliminated.

When the lap seam 32 is tightly made, the metal cover 14 and vessel 12 will tend to confine the gases generated by the cooking process. In order to relieve some of the gas pressure developed in the expanding and expanded package 10, it is recommended that a small hole be punched in the cover, substantially central of its diameter, to serve as a relief valve. Rolled seams as well as other suitable manners and means of conjoining the cover 14 and vessel 12 at their peripheral edges is, of course, within the contemplation of the invention.

It is to be understood that the details of the foregoing specification may be changed and varied in greater or lesser degree without departing from the essence of my invention.

I claim:

A package of popcorn in which the same is prepared for consumption consisting of a metallic vessel, an expansible, inflatable metallic cover for said vessel conjoined thereto at their peripheral edges, and popcorn and a frying fat contained in said vessel under said cover, said cover being arranged concavely in said vessel over said popcorn and fat, said cover adapted to expandibly inflate upon popping of said popcorn and to form an enlarged expanded enclosure in a convex form with said vessel for said popped corn, and said cover consisting of a quantity of material sufficient to form upon inflation an enclosure with said vessel several times the initial volume contained between said vessel and said cover.

BENJAMIN W. COLMAN.

References Cited in the file of this patent

UNITED STATES PATENTS

| Number | Name | Date |
|---|---|---|
| 2,480,679 | Spencer | Aug. 30, 1949 |
| 2,495,435 | Welch | Jan. 24, 1950 |
| 2,501,400 | Marshall | Mar. 21, 1950 |
| 2,648,610 | Martin | Aug. 11, 1953 |

OTHER REFERENCES

Food Engineering, November 1951, page 156.